(12) United States Patent
Marino, Jr.

(10) Patent No.: US 6,980,611 B1
(45) Date of Patent: Dec. 27, 2005

(54) SYSTEM AND METHOD FOR MEASURING RF RADIATED EMISSIONS IN THE PRESENCE OF STRONG AMBIENT SIGNALS

(75) Inventor: Michael A. Marino, Jr., Laguna Niguel, CA (US)

(73) Assignee: Scientific Applications & Research Associates, Inc., Cypress, CA (US)

( * ) Notice: Subject to any disclaimer, the term of this patent is extended or adjusted under 35 U.S.C. 154(b) by 0 days.

(21) Appl. No.: 09/497,292

(22) Filed: Feb. 3, 2000

Related U.S. Application Data (60) Provisional application No. 60/119,157, filed on Feb. 8, 1999.

(51) Int. Cl.[7] ............................ H04D 1/04; H04B 1/10
(52) U.S. Cl. ....................................... 375/346
(58) Field of Search ................. 375/346, 316; 381/94.7; 455/296, 303, 305, 306, 133, 135, 455/136, 278.1, 272, 269

(56) References Cited

U.S. PATENT DOCUMENTS

| | | | |
|---|---|---|---|
| 4,636,586 A * | 1/1987 | Schiff ........................ | 379/360 |
| 4,672,674 A * | 6/1987 | Clough et al. ............. | 381/94.7 |
| 4,912,767 A * | 3/1990 | Chang ....................... | 704/205 |
| 4,956,867 A * | 9/1990 | Zurek et al. .............. | 381/94.7 |
| 5,398,286 A * | 3/1995 | Balestri et al. ........... | 381/94.3 |
| 6,289,004 B1 * | 9/2001 | Mesecher et al. .......... | 370/256 |

OTHER PUBLICATIONS

Lapedes, McGraw-Hill Dictionary of Scientific and Technical Terms Second Edition, New York, pp. 19 and 1316, 1978.*

* cited by examiner

Primary Examiner—Kevin Burd
(74) Attorney, Agent, or Firm—Stetina Brunda Garred & Brucker (57) ABSTRACT

A system for suppressing ambient signals from a signal containing radiated emissions of a electronic device and ambient signals. The system comprises a first receiver operative to receive the ambient signals and the radiated emissions from the electronic device. The first receiver is operative to demodulate and digitize the ambient signals and the radiated emissions. The system further comprises a second receiver operative to receive primarily the ambient signals wherein the second receiver is time and frequency synchronized to the first receiver and operative to demodulate and digitize the ambient signals. A central computer is in electrical communication with the first and second receivers and is operative to store and process the ambient signals and the radiated emissions from respective ones of the first and second receivers. Accordingly, the central computer is configured as an adaptive filter operative to suppress the ambient signals correlated between the first and second receivers. Therefore, the radiated emissions from the electronic device are extracted thereby.

19 Claims, 4 Drawing Sheets

SYSTEM AND METHOD FOR MEASURING RF RADIATED EMISSIONS IN THE PRESENCE OF STRONG AMBIENT SIGNALS

CROSS-REFERENCE TO RELATED APPLICATIONS

The present invention claims priority to Provisional Patent Application Ser. No. 60/119,157 entitled VIRTUAL CHAMBER MEASURING RF RADIATED EMISSIONS IN THE PRESENCE OF STRONG AMBIENT SIGNALS filed on Feb. 8, 1999, the disclosure of which is incorporated expressly herein by reference.

BACKGROUND OF THE INVENTION

The present invention generally relates to the area of electronic test equipment. More specifically, the present invention pertains to devices that are capable of measuring electromagnetic or radio frequency (RF) radiated emissions of electronic equipment in the presence of strong ambient signals.

Electronic equipment radiates RF energy (i.e., RF radiated emissions) during normal operation that can interfere with nearby electronics. The trend toward small, low power, high density electronics has made modern electronic devices increasingly more susceptible to such RF interference. For example, turning on a microwave oven near a personal computer may cause the personal computer to lock up, or radio frequency noise from an automobile ignition may introduce static in a nearby AM radio receiver.

To ensure that electronic devices do not produce harmful amounts of radiated RF emissions, government regulators, such as the U.S. Federal Communications Commission (FCC) and the European Union EC Directives, impose radiated emission and immunity regulations on equipment manufactures. Such regulations include ensuring that radiated RF emissions from electronic equipment are below certification levels at specified distances and over specified frequency ranges. Additionally, electronic equipment must be able to function reliably when exposed to certification RF field levels over specified frequency ranges.

A number of commercially available instruments, such as spectrum analyzers and receivers, are used to measure RF emissions. These instruments can be programmed to automatically scan the frequency band of interest, record the detected RF field strength, and compare such RF field strengths with the appropriate certification level. Unfortunately the RF radiation emitted by the electronic device under test can be weaker than ambient field strengths emitted from local transmitters (e.g., signals from TV and radio stations). Commercially available spectrum analyzers and receivers typically cannot differentiate between the RF radiation from the electronic device under test and the much stronger ambient signals. Additionally, the stronger ambient signals will mask the emission signals from the electronic device under test if they both occupy the same frequency.

Several test methods have been developed to isolate and measure RF radiated emissions from electronic devices under test. For example, RF anechoic chamber test methods, remote open area test site test methods, urban open area test site test methods, device power cycling test methods, and ambient cancellation using signal subtraction test methods are commonly used for measuring the RF radiated emissions from electronic devices under test.

The RF anechoic chamber test method measures low level radiated emissions from electronic devices inside a large RF anechoic chamber. The outer walls of the chamber form a shielded room (i.e., metal enclosure) in order to block out the undesired external ambient signals. The inside surfaces of the shielded room are covered with anechoic material that absorbs RF energy. The anechoic material serves to absorb the radiated emissions from the electronic device so that measured signals are not distorted by reflections. Therefore, the radiated emissions measured inside the anechoic chamber will be equivalent to measuring the same emissions outdoors when little or no ambient signals are present. The radiated emissions from the electronic device inside the anechoic chamber are measured using standard field sensors with spectrum analyzers or receivers.

The RF anechoic chamber test method provides a highly accurate and reliable test technique since the RF anechoic chamber suppresses ambient signals by as much as 60 to 100 dB. Furthermore, standard test equipment may be used to measure the ambient signals. Accordingly, the RF anechoic chamber test method is widely used to perform radiated emission certification testing. However, the RF anechoic chamber test method is disfavored due to the necessity to procure and maintain expensive RF anechoic chambers. Specifically, a three meter RF anechoic chamber may cost several hundred thousands of dollars and a ten meter chamber may cost well over a million dollars. Only test laboratories and large manufactures can afford to purchase such chambers in order to use the RF anechoic chamber test method.

As previously mentioned, another test method that is used is the remote open area test site test method wherein an outdoor facility is built in a remote location which is far-removed from sources of ambient signals. The ambient signal strengths at these remote locations are well below the radiated emissions certification levels of the electronic device under test. The radiated emissions of the electronic device can then be measured using standard measurement techniques. The remote open area test site test method produces sufficiently accurate measurements. The ambient signals at the remote test sites are generally 20 to 60 dB lower than those in urban environments. While this test method is not as sensitive as the anechoic chamber test method, it does accurately measure radiated emissions which are near or above certification levels. Furthermore, the remote open area test site test method is widely used to perform radiated emissions certification testing because such method uses standard test equipment. However, the remote open area test site test method is disfavored due to the construction and maintenance costs of the remote outdoor test facility. While the initial cost of a remote test site can be significantly lower than purchasing an anechoic chamber, the maintenance and operational cost of such remote outdoor test facility can be very high. An additional problem is that as cites expand, these remote areas are more difficult to locate. It is very difficult to find a location where the is no TV, radio, cell phones, police radios, and ham radios (to name a few). In areas where this is possible, costs associated with bring personnel and equipment to and from this location is high.

The urban open test site test method is used where access to an anechoic chamber or a remote test facility are not possible. This test method measures radiated emissions of an electronic device in an urban setting. In order to practice the urban open test site test method, an experienced operator with highly sensitive spectrum analyzers or receivers must be present. The experienced operator initially scans the ambient environment to determine the frequencies and field strengths of ambient signals. Typically, radiated emissions deviating from these ambient signals can be readily identified by the operator. In cases where a frequency of a radiated emission is near the frequency of an ambient signal, the experienced operator carefully narrows the resolution bandwidth of the spectrum analyzer in order to separate the two signals. If the frequency of the radiated emission is very close to or at the frequency of the ambient emission, then the urban open test site test method fails to separate and detect the radiated emission.

The urban open test site test method can be conducted in urban outdoor environments. However, this method has limited accuracy for emission frequencies which are not clearly distinct from ambient frequencies. Furthermore, this test method requires highly trained personnel as well as the use of highly sensitive spectrum analyzers. This method cannot be used to certify electronic devices due to the limited accuracy thereof. A major problem with this method is that the bandwidth required to separate these signals is not at the bandwidth specified by the regulatory agencies. Therefore, this measurement technique cannot be used to measure the signal's strength. It can only be used to identify the signals frequency. Another problem with this method is that it can only be used when the emissions signal is not changing frequencies and it cannot be used when the emissions and ambient signals are very close in frequency. However, this method can be used for limited pre-compliance testing and trouble shooting, such as during the process of searching, monitoring, and tracking radiated emission frequencies.

The device power cycling test method requires measuring the ambient signals with the electronic device being off. The ambient signals' power levels and frequencies are recorded. The electronic device is now turned on and another set of measurements is made which include the electronic device emissions and ambient signals. The power level and frequencies are recorded. The two recorded measurements are then overlaid or subtracted from each other with the assumption that the result consists of only measurements from the electronic device's emissions. A major problem with this method is that it does not work if the electronic device's emissions are at the same frequencies, but lower, than the ambient signals. Also, this method does not work if any ambient signals change frequency, which most do. FM radio signals, by definition, are changing frequencies. Another problem is that ambient signals, which change levels or turn on and off, can be incorrectly identified as the device's emissions. A simple example is having a nearby cellular phone off during the ambient only measurements and then having the phone turned on during the device emissions measurements. In this example, the cell phone frequencies would be incorrectly identified as frequencies coming from the electronic device.

The ambient cancellation using subtraction test method attempts to electronically cancel the ambient signals by simultaneously recording RF field measurements at two locations. The first location is near the electronic device being tested and the second location is far therefrom. The second location is sufficiently far away so that it does not detect the weak radiated emissions from the electronic device under test. The much stronger ambient signals are simultaneously recorded at both locations, while the radiated emissions from the electronic device are detected only at the first location. This test method attempts to cancel the undesired ambient signals and isolate the residual radiated emissions from the electronic device by aligning, scaling, and subtracting the signals recorded at both locations.

This test method may be conducted in urban environments. However, it cannot account for differences in two simultaneously received ambient signals caused by multipath distortion. Accordingly, the ambient signal cancellation is very unreliable. Furthermore, this test method does not take into account the frequency drift and jitter between the two recording receivers thereby making signal alignment very difficult and time consuming. Manual adjustment of alignment, scale, and subtraction for each ambient signal is therefore required at each and every ambient frequency with this test method. This manual alignment process if very time consuming and error prone. The ambient cancellation using subtraction test method additionally fails when the much stronger ambient signals are at the same frequency as the desired radiated emissions of the electronic device since most recording instruments do not have the adequate resolution and sensitivity to isolate the signal of interest by using simple subtraction. Therefore, this test method is not used for compliance or pre-compliance testing because it is highly unreliable.

The present invention addresses the above-mentioned deficiencies in the prior art test methods by electronically sensing and suppressing undesired ambient signals, even when those ambient signals are at the same frequency and stronger than the radiated emissions from the equipment under test. Accordingly, the present invention can yield the performance of a standard spectrum analyzer used inside an enclosed RF anechoic chamber. The present invention does not require expensive RF anechoic chambers, or expensive remote test sites. Additionally, the present invention is automated and does not require highly trained personnel nor the use of highly sensitive spectrum analyzers, nor does it require manual alignment of signals. The present invention accounts for differences in simultaneously received ambient signals caused by multipath distortion thereby resulting in reliable ambient signal suppression. The present invention accounts for ambient signals that change frequency and/or levels, as well as ambient signals that turn on and off. Furthermore, the present invention takes into account the frequency drift and jitter between receivers thereby creating optimal ambient suppression performance. Accordingly, the present invention recovers radiated emissions from an electronic device when such emissions are hidden by much stronger ambient signals. The present invention provides an improvement over the prior art test methods because the present invention provides for a method which can accurately suppress ambient RF signals thereby resulting in measurement of the radiated emissions from the electronic device being tested.

BRIEF SUMMARY OF THE INVENTION

A system for suppressing ambient signals from a measurement containing both radiated emissions of a electronic device and ambient signals. The system comprises a first receiver operative to receive the ambient signals and the radiated emissions from the electronic device. The first receiver is operative to demodulate and digitize the ambient signals and the radiated emissions. The system further comprises a second receiver operative to receive primarily the ambient signals wherein the second receiver is time, frequency, and phase synchronized to the first receiver and operative to demodulate and digitize the ambient signals. A central computer is in electrical communication with the first and second receivers and is operative to store and process the ambient signals and the radiated emissions from respective ones of the first and second receivers. Accordingly, the central computer is configured as an adaptive filter operative to suppress the ambient signals correlated between the first and second receivers' measurements. Therefore, the radiated emissions from the electronic device are extracted thereby.

In accordance with a preferred embodiment of the present invention, the system further comprises a first sensor in electrical communication with the first receiver and operative to receive the ambient signals and the radiated emissions. Furthermore, a second sensor is in electrical communication with the second receiver and is operative to receive primarily the ambient signals. The first and second sensors may be antennas which are physically distributed from one another. Accordingly, a first telemetry link may be provided between the first sensor and the first receiver, and a second telemetry link may be provided between the second sensor and the second receiver. The first and second telemetry links may be a electrically conducting cable link, an optical fiber link, and/or an RF telemetry link.

As will be recognized to those of ordinary skill in the art, the first receiver may be co-located with the first sensor and the second receiver may be co-located with the second sensor. Alternatively, the first and second receivers may be co-located within a single housing. In either instance, the system may further comprise a clock operative to generate a clock signal that synchronizes the first and second receivers. Accordingly, an optical link between the first and second receivers may be provided in order to transfer the clock signal therebetween. Alternatively, a electrically conducting cable may be linked between the first and second receivers in order to transfer the clock signal therebetween.

It will also be recognized that in order to synchronize the first and second receivers, a first clock may be in electrical communication with the first receiver and a second clock may in electrical communication with the second receiver. Therefore, the first clock and second clock will be synchronized in order to provide synchronization between the first and second receivers. Instead of using a clock, an external RF reference signal may be operative to synchronize the first and second receivers.

In accordance with the preferred embodiment of the present invention, the central computer may further comprise a digital signal processor operative to facilitate calculations of the adaptive filter. The adaptive filter may be configured to operate by a Stochastic Gradient method or a Gradient Descent method. Additionally, the adaptive filter may be configured to operate by a Least Squares method or a neural network adaption method. As will be recognized, in the preferred embodiment, the adaptive filter structure may be a Finite Impulse Response Filter or a Infinite Impulse Response Filter or a combination of both filters.

Further in accordance with the present invention, there is also provided a method of suppressing ambient signals from a signal that also contains radiated emissions of an electronic device. The method comprises detecting the ambient signals and the radiated emissions with a first receiver. The first receiver then demodulates and digitizes the ambient signals and the radiated emissions. Next, a second receiver detects primarily ambient signals and demodulates and digitizes the same. Finally, the ambient signals correlated between the first and second receivers are suppressed with an adaptive filter. Typically, the adaptive filter is implemented on a computer and the step of suppressing the ambient signals is accomplished with the adaptive filter of the computer.

BRIEF DESCRIPTION OF THE SEVERAL VIEWS OF THE DRAWING

These as well as other features of the present invention will become more apparent upon reference to the drawings wherein.

DETAILED DESCRIPTION OF THE INVENTION

Figure 1:
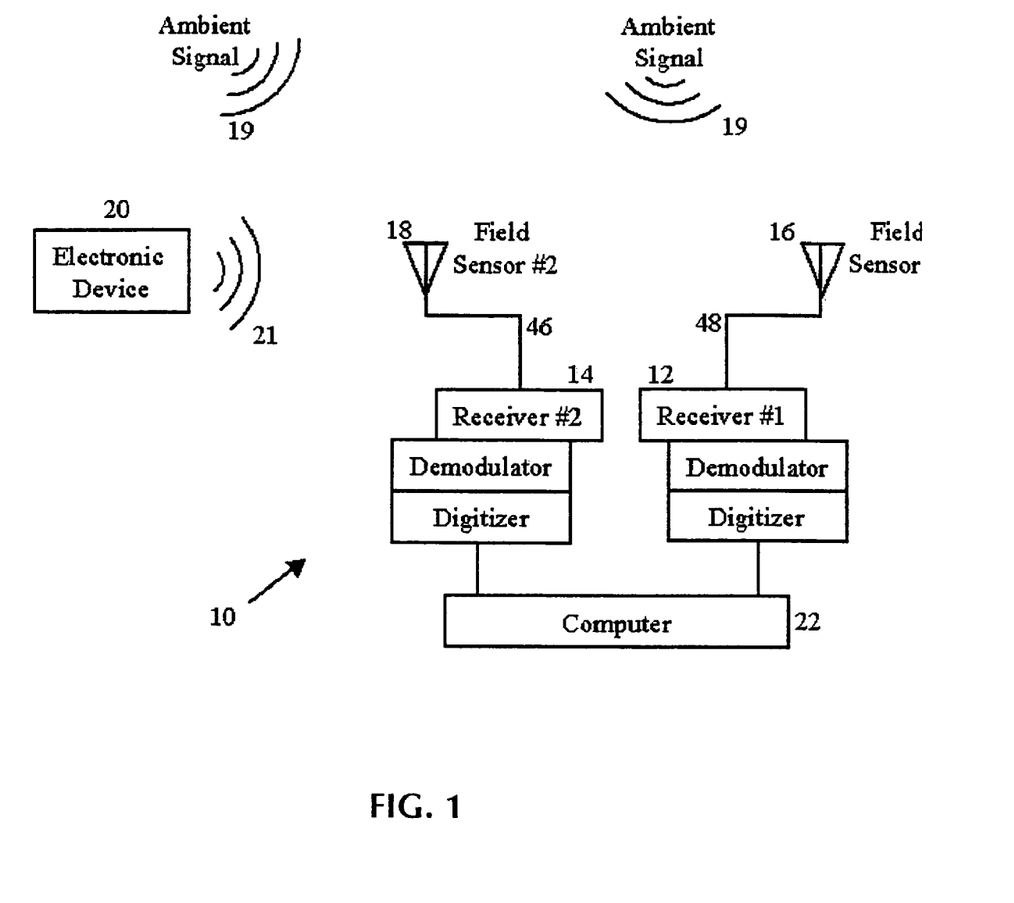
FIG. 1 is a schematic representation of the present invention used for testing radiated emissions.

Referring now to the drawings wherein the showings are for purposes of illustrating a preferred embodiment of the present invention only, and not for purposes of limiting the same, FIG. 1 shows an ambient suppression test configuration 10 for radiated emissions testing. The test configuration 10 comprises a first receiver 12 and a second receiver 14. The first receiver 12 is in electrical communication with a first field sensor 16. Similarly, the second receiver 14 is in electrical communication with a second field sensor 18. As seen in FIG. 1, the first field sensor 16 and the second field sensor 18 are both disposed in a location whereat they may receive ambient RF signals 19. As will be recognized by those of ordinary skill in the art, the ambient RF signals 19 are typically RF electromagnetic radiation emitted by local transmitters. Such ambient RF signals 19 may be produced by local television and radio stations, cellular phones, citizens band radios, ham radios, civil radios (e.g., police, ambulance, fire), and aircraft radios to name a few.

The second field sensor 18 is located near an electronic device 20 that is radiating RF device emissions 21 to be measured. The electronic device 20 will emit electromagnetic RF emissions 21 that are to be measured. Accordingly, the second field sensor 18 will receive both ambient RF signals 19 as well as device emissions 21 from the electronic device 20. However, the first field sensor 16 is located in a position whereat it will receive primarily ambient RF signals 19, as seen in FIG. 1. The preferred embodiment is to have the first field sensor 16 be at lest ten times further away from the device 20, than the distance from the second field sensor 18 to the device 20. As an example, if the distance from the second field sensor 18 to the device 20 is 3 meters, then the distance from the first field sensor 16 to the device 20 should be at least 30 meters. This "ten times" rule allows the first field sensor 16 to detect the device emissions 21 at a greater than or equal to 20 dB reduction in power level than the second field sensor 18. This minimum 20 dB power level reduction helps to ensure that the first field sensor 16 receives primarily ambient RF signals 19.

The first and second field sensors 16, 18 may be in electrical communication with respective ones of the first and second receivers 12, 14 through a telemetry link. Accordingly, a first telemetry link 46 will be provided between the first field sensor 16 and the first receiver 12. Correspondingly, a second telemetry link 48 will be provided between the second field sensor 18 and the second receiver 14. The first and second telemetry links 46, 48 may be a electrically conducting cable link, an optical fiber link, or an RF telemetry link.

Both the first receiver 12 and the second receiver 14 are in electrical communication with a computer 22. The computer 22 is configured to remove the ambient RF signals 19 from the signals received by the second field sensor 18. Additionally, the computer 22 is capable of controlling the operation of the first and second receivers 12, 14 and capable of storing and processing the digitized data recorded therefrom. In the preferred embodiment, the computer 22 is a 450 MHz Pentium machine running WINDOWS NT 4.0 with a PCI board that contains two digital signal processors and two programmable digital down converters added to speed numerical data processing.

In the preferred embodiment, the first and second receivers 12, 14 are customized receiver systems which are time, frequency, and phase synchronized. The first and second receivers 12, 14 demodulate and digitize the output of the first and second field sensors 16, 18 and transmit such output to the computer 22. Preferably, the first and second receivers 12, 14 are CASSPER® receivers manufactured by CASSPER® Instrumentation Systems of Lake Forest, Calif. and are inherently time, frequency, and phase synchronized. For maximum performance, the first and second receivers 12, 14 may be co-located in a single housing and share the same local oscillator clock.

The local oscillator clock may generate a clock signal which is transferred between the first and second receivers 12, 14 through either an optical link (i.e., optical fiber) or a electrically conducting cable. Alternatively, the first and second receivers may be synchronized via an RF telemetry link. It is not necessary for the first and second receivers 12, 14 to be co-located within a single housing, but they may be co-located with respective first and second field sensors 16, 18. In addition to using a single clock to synchronize the first and second receivers 12, 14, each receiver 12, 14 may comprise its own respective clock to provide synchronization therebetween. Therefore, a first clock will be in electrical communication with the first receiver 12 and a second clock will be in electrical communication with a second receiver 14. The first and second clocks will be synchronized therebetween in order to provide synchronization for the first and second receivers 12, 14.

In order to suppress the ambient signals 19, the computer 22 is configured as an adaptive filter signal processing system. Accordingly, the computer 22 receives and records the signals detected by the first and second field sensors 16, 18 and respective ones of the first and second receivers 12, 14. The computer 22 derives the device emissions 21 radiated from the electronic device 20.

Figure 2:
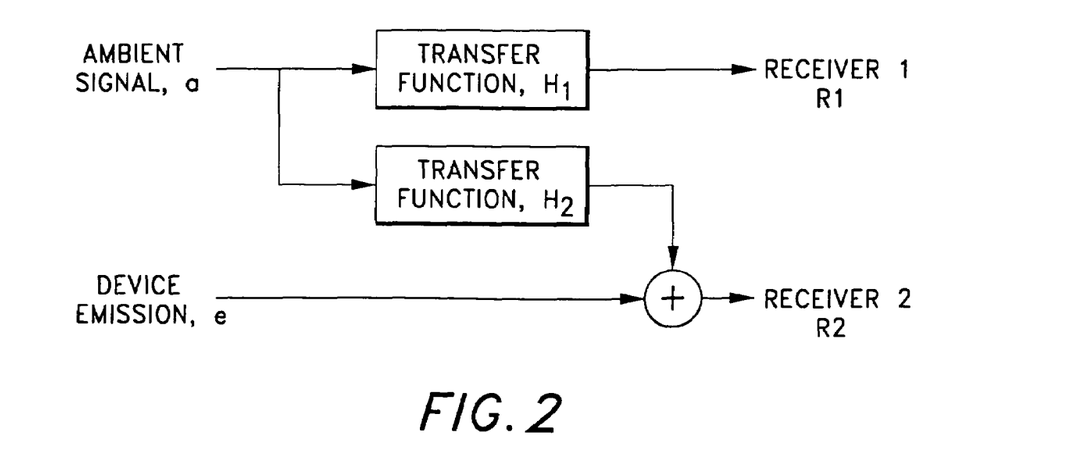
FIG. 2 is block level diagram of the suppression signal structure of the present invention.

Referring to FIG. 2, a block diagram of the ambient suppression signal structure shows the signal relationships between the first and second receivers 12, 14 and received ambient signals (a) and device emissions (e) from the electronic device 20. In order to properly measure the emissions (e) from the electronic device 20, some underlying assumptions must be made. It is assumed that ambient signals (a) are measured by the first and second receivers 12, 14 and such emissions are correlated with each other. Additionally, the emissions (e) from the electronic device 20 are primarily measured by a single receiver (i.e., second receiver 14). Furthermore, the emissions (e) from the electronic device 20 are not correlated with the ambient signals (a). With these basic underlying assumptions, FIG. 2 shows the first receiver 12 measuring ambient signals (a) through some unknown transfer function $H_1$ without emissions (e) from the electronic device 20. The second receiver 14 measures ambient signals (a) through some unknown transfer function $H_2$ with the emissions e of the electronic device 20. Accordingly, the first receiver 12 receives a signal R1, while the second receiver 14 receives a signal R2. A matrix format for the signal relationships between the first and second receivers 12, 14 is shown below as Equation 1:

$$\begin{bmatrix} R_1 \\ R_2 \end{bmatrix} = \begin{bmatrix} H_1 & 0 \\ H_2 & 1 \end{bmatrix} \begin{bmatrix} a \\ e \end{bmatrix} \quad (1)$$

As shown in Equation 1, the upper right matrix term is 0 which indicates that the first field sensor does not measure the device missions. As stated earlier, the preferred field sensor configuration gives a minimum of 20 dB power level reduction of the device emissions at the first field sensor as compared to the second field sensor. This implies that the upper right matrix term of Equation 1 is no larger than $\frac{1}{100}$.

Figure 3:
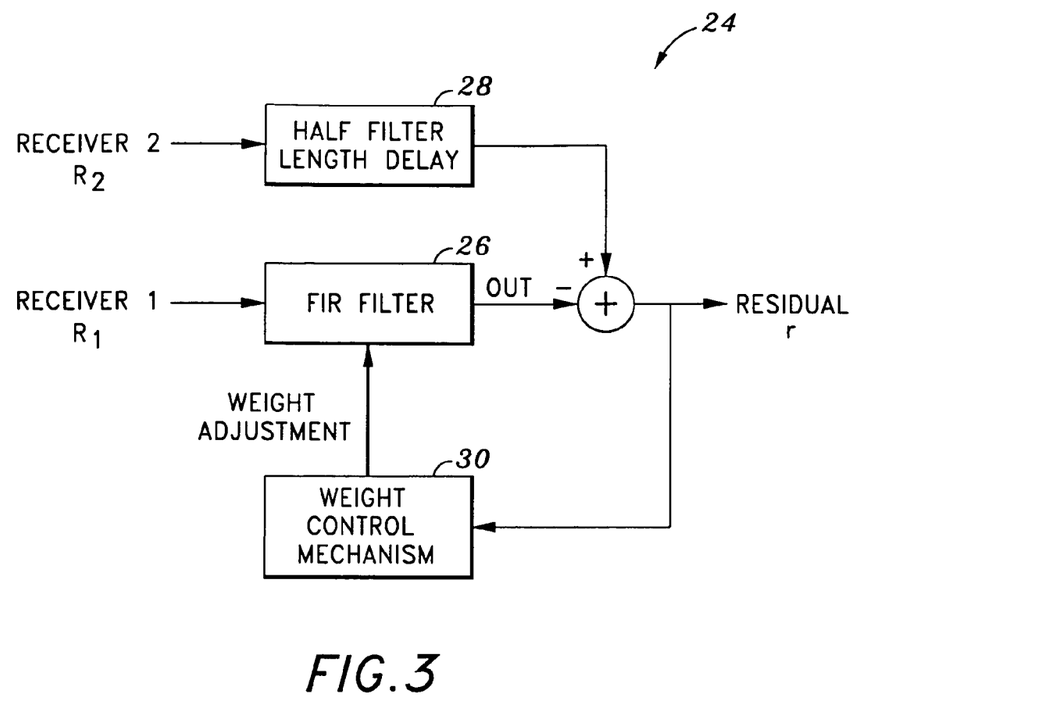
FIG. 3 is a block level diagram of the adaptive filter topology used in the present invention.

Referring to FIG. 3, an adaptive filter structure 24 used for suppression of ambient signals (a) is shown. The adaptive filter structure 24 includes a finite impulse response filter (FIR) 26. The output $R_1$ from the first receiver 12 is used as the input to the FIR filter 26. The adaptive filter structure 24 further includes a half filter length delay 28. The output $R_2$ of the second receiver 14 is used as the input for the half filter length delay 28. Accordingly, the output $R_2$ from the second receiver 14 will be delayed by half of the delay for the FIR filter 26. As shown in FIG. 3, the output from the FIR filter 26 is subtracted from the delayed output from the second receiver 14. Therefore, a residual signal (r) is produced. The residual (r) is used by a weight control mechanism 30 to adjust the characteristics of the FIR filter 26. An adaptive algorithm for the adaptive filter structure 24 determines the characteristic of the weight control mechanism 30, as will be further explained below.

The adaptive filter structure 24 uses a half filter length delay 28 because the phase relationship between the first and second receivers 12, 14 is not known. The half filter length delay 28 delays the signal from the second receiver 14 thereby allowing the FIR filter 26 to either phase retard or phase advance the relationship between the signals from the first and second receivers 12, 14. This ability is critical because the direction of arrival of the ambient signals (a) is not known, which implies that the ambient signals (a) could sometimes be measured first by the first receiver 12 or first by the second receiver 14. Cancellation of ambient signals (a) for both scenarios require both phase retarding and phase advancement of the relationship of the signals from the first receiver 12 and the second receiver 14.

As previously mentioned, an adaptive algorithm determines the characteristics of the weight control mechanism 30. The two most common classes of adaptive filter algorithms are Stochastic Gradient based algorithms and Least-square based algorithms. The purpose of the weight control mechanism 30 is to adjust the FIR filter 26 in such a way as to minimize the residual signal (r). Stochastic gradient algorithms will minimize the mean-square of the residual signal (r). Least-square algorithms will minimize the square of the residual signal (r). Regardless of the algorithm used, the weight control mechanism 30 will attempt to remove (i.e., suppress) the signals that are correlated between the first and second receivers 12, 14. This results in the residual signal (r) being comprised of those signals that are uncorrelated between the first and second receivers 12, 14. As previously mentioned, one of the underlying assumptions is that ambient signals (a) are correlated between the first and second receivers, 12, 14 and that device emissions (e) from the electronic device 20 are uncorrelated. These assumptions applied to the cancellation process result in the residual signal (r) being equal to the emissions (e) from the electronic device 20.

Figure 4:
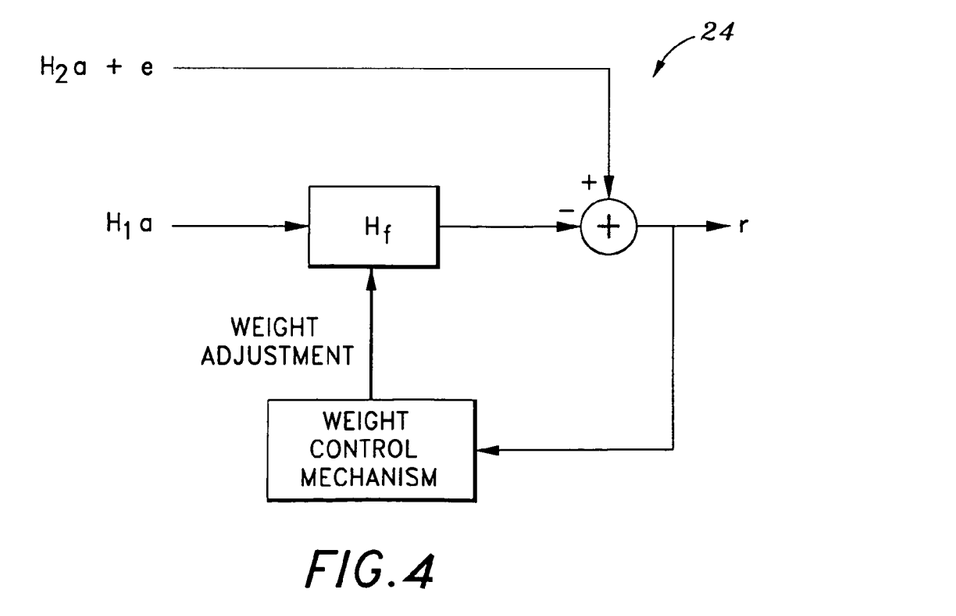
FIG. 4 is a block level diagram showing the adaptive filter topology of FIG. 3 and including variable names.

Referring to FIG. 4, the adaptive filter structure 24, described by FIG. 3, is shown using the signal structure described by FIG. 2. The half filter length delay 28 can be ignored in FIG. 4 because its effect on the system is compensated by the FIR filter transfer function, $H_f$. $H_2a+e$ is equal to the output of the second receiver 14, including ambient signals (a) and device emissions (e) from the electronic device 20. $H_1a$ is equal to the output of the first receiver 12. $H_1a$ is inputted into the FIR filter having a transfer function $H_f$.

Accordingly, the mathematical formulation for the adaptive filter structure 24, as shown in FIG. 4, is as follows:

$$r=(H_2a+e)-(H_fH_1a) \quad (2)$$

Rearranging the terms gives:

$$r=(H_2-H_fH_1)\cdot a+e \quad (3)$$

Therefore the residual (r) is comprised of two signal types:

$$r=\text{correlated signals}+\text{uncorrelated signals} \quad (4)$$

Where

Correlated signals=$(H_2-H_fH_1)a$

Uncorrelated signals=$e$

The weight control mechanism 30 will remove the correlated signals by adjusting $H_f$ in the following manner:

desire: $(H_2-H_fH_1)\cdot a \to 0$ achieved by: $H_f \to H_2H_1^{-1}$ (5)

This results in:

$$r \to e \quad (6)$$

Therefore, the ambient signals are cancelled and the emissions (e) from the electronic device 20 are correctly extracted.

Figure 5:
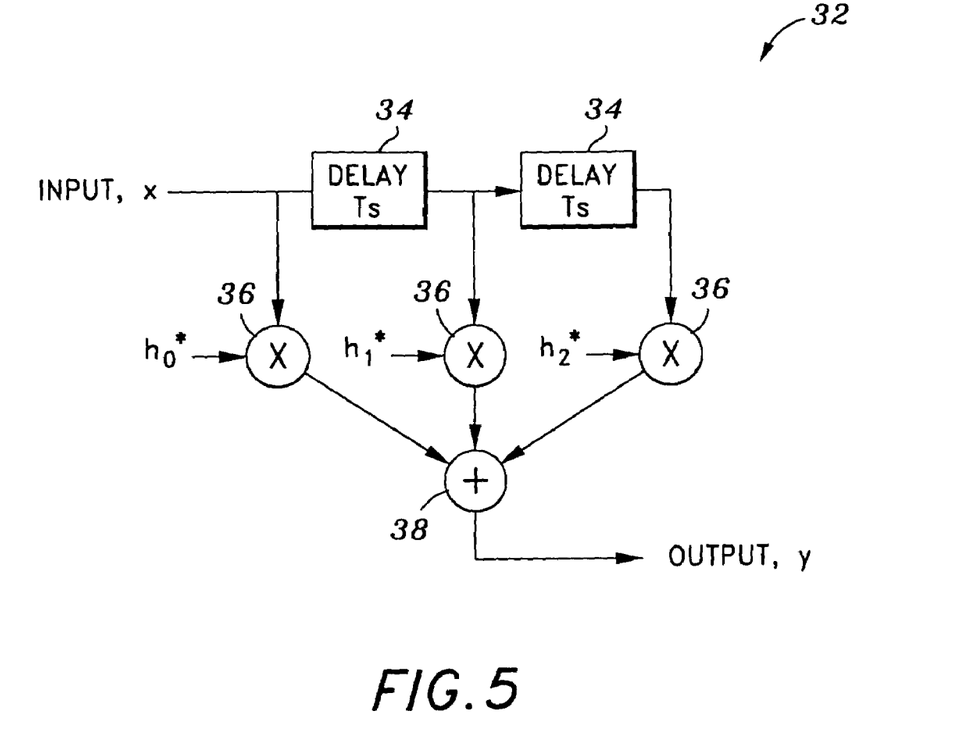
FIG. 5 is a block level diagram of a three tap finite impulse response filter of the present invention.

Referring to FIG. 5, a block diagram of a three tap FIR filter 32 is shown. The three tap FIR filter 32 is an example of the finite impulse response filter 26 previously mentioned. The three tap FIR filter 32 consists of a delay $T_s$ 34, a multiplier 36, and an adder 38. Each delay $T_s$ 34 is the time delay associated with the sampling period $T_f$ of the hardware digitizer (e.g., analog-to-digital converter). As seen in FIG. 5, the filter coefficients, $h=[h_0 h_1 h_2]^T$ define the behavior of the three tap FIR filter 32. The coefficients can be complex or real valued. Therefore, the defining equation for an N tap FIR filter is:

$$Y[n] = \sum_{k=0}^{N-1} h_k^* x[n-k] \quad (7)$$

where:

x [n]=sampled input sequence y [n]=filtered output sequence

In general, each coefficient can be complex so $h_k$ can be described in terms of an amplitude, $b_k$, and a phase term, $\theta_k$ as:

$$h_k=b_k e^{j\theta_k} \quad (8)$$

Equations 7 and 8 can be combined to give the three tap FIR filter 32 characteristics in terms of magnitude and phase terms, as shown by the following equation:

$$Y[n] = \sum_{k=0}^{N-1} b_k e^{-j\theta_K} X[n-k] \quad (9)$$

The filter coefficients $h_k$ do not change for fixed filters and are real-time adjustable for adaptive filters. An FIR filter's characteristics are solely determined by the number of taps N and the filter coefficient values $h_k$.

The use of a finite impulse response filter offers several advantages over other types of filters. These advantages include the FIR filter being stable for finite coefficients. Furthermore, the FIR filter has an inherent time delay which makes it an excellent candidate for transfer functions with delays, such as the present case with multipath signals. Transients for the FIR filter will decay to zero in a finite amount of time.

Additionally, the finite impulse response structure is used in adaptive filters because stability is guaranteed and relatively simple and numerically efficient algorithms exist for adjusting the weight values. Furthermore, performance of the FIR structure is well understood in terms of stability and convergence. The FIR structure is also easy to implement in hardware.

Figure 6:
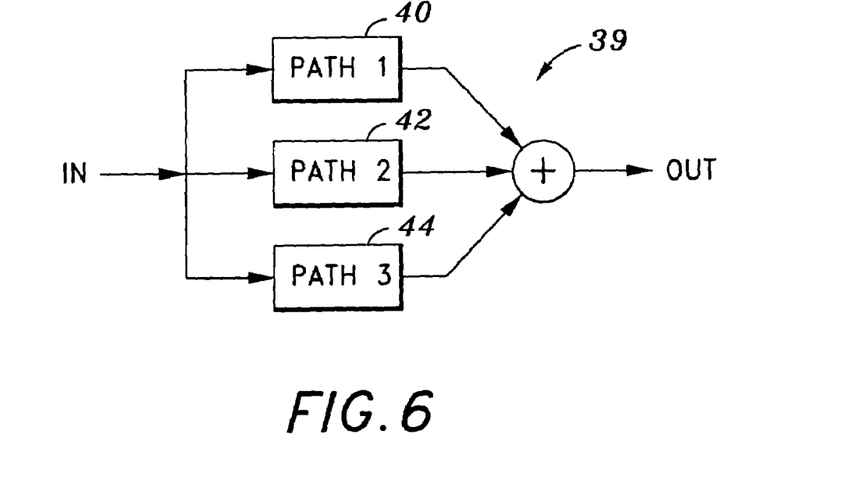
FIG. 6 is a block level diagram showing multipath signal input and output for the present invention.

As previously mentioned, the test configuration 10 is ideally suited for scenarios where the ambient signals (a) are received by the first and second receivers 12, 14 through multipaths. Referring to FIG. 6, multipath is a situation wherein electromagnetic energy propagates from one location to another through a collection of N multiple paths. Multipath is a common occurrence when measuring ambient signals (a). It is predominately due to signals reflecting from structures, such as buildings, cars, hillsides, etc. The adaptive filter must produce FIR filter characteristics dependant upon the transfer function from the ambient source to each receiver's antenna. Therefore the FIR filter is required to handle transfer functions with a multipath configuration.

As seen in FIG. 6, an example multipath configuration 39 may comprise a first path 40, a second path 42 and a third path 44. Each of the paths 40, 42, 44 can be modeled as having a time delay and a gain factor. The time delay is caused by a difference in propagation length between each path. The gain factor is the amount a given path changes the amplitude of the signal. As an example, the input signal could be a complex sinusoidal signal that is free from multipath, as represented by the following time-domain equation:

$$a(t)=A\cdot e^{j(2\pi f_o t+\Phi_o)} \quad (10)$$

For one path, the input signal a(t) is delayed by some amount τ, with a gain factor b. This results in an output:

$$\text{out}(t)=bA\cdot e^{j(2\pi f_o(t-\tau)+\Phi_o)} \quad (11)$$

For a sampled data system, the time delay can be modeled as an integer number M of sample periods $T_s$ minus a fractional sample delay Δτ. This delay model is represented as:

$$\tau=MT_s-\Delta\tau \quad (12)$$

Substituting the delay model from Equation 12 into Equation 11 yields an output:

$$out(t) = bA \cdot e^{j \cdot [2\pi f_o(t - MT_s + \Delta \tau) + \Phi_o]} \quad (13)$$

For a sampled data system, time is represented as an integer multiple n of the sample period. This is represented as:

$$t = nT_s \quad (14)$$

Substituting the sampled time model from Equation 14 into Equation 13 yields:

$$out(nT_s) = bA \cdot e^{j \cdot [2\pi f_o(nT_s - MT_s + \Delta \tau) + \Phi_o]} \quad (15)$$

Rearranging the terms of Equation 15 yields:

$$out(nT_s) = be^{j \cdot 2\pi f_o(\Delta \tau)} \cdot A e^{j \cdot \pi f_o T_s (n - M) + \Phi_o]} \quad (16)$$

For sampled data systems, the sample period factor is normally dropped and square brackets are used to denote sampled signals, as opposed to continuous time signals. Accordingly, this yields:

$$out[n] = be^{j \cdot 2\pi f_o(\Delta \tau)} \cdot A e^{j \cdot [2\pi f_o T_s (n - M) + \Phi_o]} \quad (17)$$

Equation 17 can be alternatively expressed as:

$$out[n] = be^{j \cdot \theta} \cdot a[n - M] \quad (18)$$

Where:

$$\theta = 2\pi f_o(\Delta \tau) \quad (19)$$

$$a[n - M] = A e^{j \cdot [2\pi f_o T_s (n - M) + \Phi_o]} \quad (20)$$

Equation 18 shows the effect of a one path time delay and gain factor on an ambient signal. For multipath measurements, the measured signal would be a sum of signals that are shown in Equation 18, with each path having its own gain and phase terms.

A comparison of the FIR characteristics, as given in Equation 9, to the summation of multipath signals from Equation 18 illustrates the matching of the FIR structure to the multipath model. As shown in Equation 5, $H_f$ of the adaptive FIR filter converges to $H_2 H_1^{-1}$ when complete cancellation has occurred. Multipath in the signals received by the second receiver 14 (as seen by $H_2$) does not reduce cancellation performance because the structure of the FIR filter matches the multipath model. However, when multipath is present in the reference receiver's measurement (i.e., first receiver 12), the FIR filter estimates the response of an infinite impulse response filter (IIR) because $H_1^{-1}$ must be estimated. This is not a problem because an arbitrarily long FIR filter, with sufficient delay, can accurately estimate an IIR filters response. As the FIR filter length increases, the estimation error in the FIR solution decreases toward zero. This can be accomplished with arbitrary accuracy.

Additional modifications and improvements of the present invention may also be apparent to those of ordinary skill in the art. Thus, the particular combination of parts described and illustrated herein is intended to represent only a certain embodiment of the present invention, and is not intended to serve as a limitation of alternative devices within the spirit and scope of the invention.

What is claimed is:

1. A system for measuring RF emissions radiated from an electronic device, comprising:
   a first RF sensor for receiving the RF emissions radiated from the electronic device at a specified first distance and a plurality of RF ambient signals emitted from local transmission sources;
   a first RF receiver in electrical communication with the first RF sensor, the first Rf receiver being operative to demodulate and digitize output of the first RF sensor;
   a second RF sensor positioned away from the electronic device by a second distance large enough to receive the radiated RF emissions with a power level at least 20 dB lower than that received by the first RF sensor, so as to primarily receive the RF ambient signals;
   a second RF receiver in electrical communication with the second RF sensor, the second RF receiver being operative to demodulate and digitize output of the second RF sensor, the second RF receiver being synchronized with the first RF receiver;
   a signal processing system in electrical communication with the first and second RF receivers, the signal processing system being operative to determine an amount of the RF emission radiated from the electronic device at the first distance by scaling and subtracting output of the second RF receiver from out of the first RF receiver.

2. The system of claim 1, wherein the local transmission sources include non-stationary sources.

3. The system of claim 1, wherein the local transmission sources are operative to transmit the ambient RF signals arriving the first and second RF sensors from unknown directions.

4. The system of claim 1, wherein second distance is at least ten times of the first distance.

5. The system of claim 1, further comprising:
   a first clock in electric communication with the first RF receiver; and
   a second clock in electric communication with the second RF receiver.

6. The system of claim 1, further comprising an external RF reference signal source for synchronizing the first and second RF receivers.

7. The system of claim 1, wherein the signal processing system includes a computer.

8. The system of claim 1, wherein phase relationship between the first and second RF receivers is unknown.

9. The system of claim 8, further comprising a half filter length delay to retard or the phase relationship between first and second RF receivers.

10. A system for measuring RF emissions radiated from an electronic device, comprising:
    a first RF sensor operative to receive the RF emissions radiated from the electronic device at a specified first distance and RF ambient signals;
    a first RF receiver in electrical communication with the first sensor, the first RF receiver being operative to demodulate the first RF sensor;
    a second RF sensor located away from the electronic device by a second distance, the second distance of the second RF sensor is at least a predetermined times larger than the first distance such that the second RF sensor primarily receives the RF ambient signals;
    a second RF receiver in electrical communication with the second RF sensor, the second RF receiver being operative to demodulate output of the second sensor;
    a signal processing system in electrical communication with the first and second RF receivers, the signal processing system being operative to determine an amount of the RF emission radiated from the electronic device at the specified first distance by scaling and subtracting output of the second RF receiver from output of the first RF receiver.

11. The system of claim 9, wherein the first and second RF are operative to digitize the outputs of the first and second RF sensor, respectively.

12. The system of claim 9, wherein the ambient RF signals are generated from non-stationary local transmitters.

13. The system of claim 9, wherein the second distance is at least ten times of the first distance.

14. The system of claim 9, wherein the first and second RF receivers have unknown phase relationship.

15. The system of claim 14, further comprising a half filter length delay for phase retard or advance between the first and second RF receivers.

16. A method of measuring RF emissions radiated from an electronic device in the environment that has a plurality of ambient RF signal sources, comprising:

using a first RF sensor to receive the RF emissions radiated from the electronic device and ambient RF radiations emitted from the ambient RF signal sources at a specified first distance;

connecting the first RF sensor to a first RF receiver to demodulate and digitize output of the first RF sensor;

using a second RF sensor at a second distance away from the electronic device to receive primarily the ambient RF radiation, the second distance being at least a predetermined times longer than the first distance;

connecting the second RF sensor to a second RF receiver to demodulate and digitize output of the second RF sensor;

connecting the first and second RF receivers to a computer; and using the computer to scale and subtract output of the second RF receiver from output of the first RF receiver, so as to determine the RF emissions radiated from the electronic device.

17. The method of claim 16, further comprising a step of synchronizing the first and second RF receivers before processing outputs thereof.

18. The method of claim 16, further comprising selecting the second distance at which the second RF sensor receives the RF emission at a power level 20 dB less than that received by the first RF sensor.

19. The method of claim 16, further comprising phase delaying or phase advance between the outputs of the first and second RF receivers.

* * * * *